Patented Jan. 30, 1923.

1,443,936

UNITED STATES PATENT OFFICE.

LOUIS WEISBERG, OF GRANTWOOD, NEW JERSEY, ASSIGNOR TO THE BARRETT COMPANY, A CORPORATION OF NEW JERSEY.

PROCESS OF MAKING A MOLDING COMPOSITION.

No Drawing.   Application filed September 24, 1921. Serial No. 503,082.

*To all whom it may concern:*

Be it known that I, LOUIS WEISBERG, a citizen of the United States, residing at Grantwood, in the county of Bergen and State of New Jersey, have invented certain new and useful Improvements in Processes of Making a Molding Composition, of which the following is a specification.

This invention relates to new and useful improvements in processes for making synthetic resinous products and compositions containing such products. The industrial utility of these products lies in their use in molding and like compositions.

It has been known for some time that resinous bodies can be formed by heating together a polyhydric alcohol, a polybasic acid of the aromatic series, and a polybasic acid of the aliphatic series. Most of these resins contain glycerol and phthalic anhydride and one other acid such as succinic, malic, tartaric, maleic or fumaric acid. According to the amount of the aliphatic acid used, products of widely different physical properties are obtained. Thus, without any aliphatic acid at all, the product is extremely brittle, while if the proportion of aliphatic acid is sufficiently increased, a tough, elastic body is produced. By proper treatment these resins may be rendered substantially inert to water and many ordinary chemicals, thus making them useful in a variety of applications.

Three classes of these resins may be distinguished, namely:

Class A. Initial condensation product; soluble in acetone; fusible; melting point seldom exceeds 120° C.; not resistant to cold water; passes on further heating into a resin of Class B.

Class B. Intermediate condensation product; insoluble in acetone; infusible; can be molded under heat and pressure; not resistant to cold water; passes on suitable heat treatment into a resin of Class C.

Class C. Final condensation product; insoluble in acetone; infusible; can be molded under heat and pressure; resistant to both hot and cold water.

These different products may be made from the same materials by suitably modifying the temperature and duration of heating. The initial condensation product is an A-resin, the intermediate product a B-resin, and the final condensation product a C-resin. The greater the extent to which the heat treatment is carried, the more inert is the product.

The methods of preparation of these three classes of resins may be briefly described as follows:

A polyhydric alcohol, such as glycerol or glycoll for example, is heated with a polybasic aromatic acid, such as phthalic diphenic, 1.8 naphthalic, or with various benzoyl-benzoic acids, such as chlorbenzoyl-benzoic, methyl-benzoyl-benzoic acid, or with a mixture of one or more of these acids. A polybasic aliphatic acid, such as succinic, tartaric, malic, maleic, citric, malo malic etc., may be substituted wholly or in part for the aromatic acid, and the heating is continued for several hours at a temperature preferably below 200° C. until the product loses its stickiness but still possesses the characteristics above set forth for class A resins. For class B resins the heating is continued for several hours, preferably at a temperature below 135° C. to prevent frothing, until the product becomes infusible and possesses the other characteristics above set forth for class B resins. In order to produce class C resins above described, the product of class B may be further heated at a temperature as high as 250° C., the temperature being permitted to rise slowly at first.

The behavior of each of these three classes of resins when brought in contact with acetone is characteristic. Class A resins dissolve in cold acetone. Resins of class B do not dissolve in cold acetone, but if they are finely powdered and allowed to stand in contact with the cold acetone for a sufficiently long time, they gradually swell and form a sort of colloidal gel. The time required for this swelling to take place varies with the fineness to which the resin is reduced, but in any event it requires at least several days. Class C resins are not materially dissolved or caused to gel by acetone, even though heated with acetone under pressure. The only noticeable effect is a very slight decrease in the hardness of the C resin.

The present invention is based on the discovery that the action of acetone on resins of class B is greatly accelerated by elevating the temperature. Thus, at the normal boiling temperature of acetone gel formation is completed within two hours, even though the resin is broken only into lumps of about pea-size. There is, therefore, not only a saving of time, but grinding of the resin is also rendered unnecessary.

This gel formation provides a convenient means of preparing these resinous products for molding and of incorporating such other materials as may be desired in the molding composition. The preferred procedure in preparing a molding composition by this process is as follows:

Two parts of class B resin are reduced to approximately pea-size, and the fillers, gums, and coloring materials to be incorporated therewith are placed together with the resin in a vessel surmounted by a reflux condenser. From one to two parts of acetone are added and the vessel heated to produce gentle boiling of the acetone for two hours. If large quantities of material are employed, it is best to provide an agitator to stir the mixture. At the end of two hours the process is complete and one has a homogeneous mixture of resin, gums, fillers, coloring material, and acetone. The acetone may be mostly removed and recovered by distillation. Not less than ninety per cent of the acetone used may be recovered in this way. After the acetone has been distilled off, the residue remains as a loose solid material which readily crumbles to a powder. Before the molding composition is ready for use, the last portions of acetone must be removed. A further quantity of acetone is recoverable at this stage.

The procedure described is usually the simplest which can be employed. Of course, the proportion of acetone may sometimes be varied considerably from that stated without harm, but it should aways be sufficient to moisten the entire mass. The temperature may not be lowered much below the boiling point without prolonging the time required for gel formation. On the other hand, the temperature may be raised considerably above the normal boiling point by heating the mass in a closed vessel, but the saving in time effected in this way is not much different from that obtained by boiling at atmospheric pressure.

It is also possible to swell the resin separately and then add the fillers, gums, and coloring materials, but in practice this method is less satisfactory than the other. In any event the fillers and coloring materials must be substantially free from moisture and ground to fairly small size.

This process permits the production of a molding compound which is extremely uniform in composition and free from any sort of heterogeneity. The process, moreover, is applicable to batches of any size and requires only simple equipment.

A further advantage is that by this treatment products may be made which have properties corresponding to the porous products of class B, that are obtained by heating class A resins at temperatures considerably above their melting points except that the products of this invention are made entirely homogeneous and free from bubbles. This makes possible a considerable reduction in the time of manufacture.

The same treatment may be applied to the resin alone without adding fillers or the like to give a product free from bubbles.

Resins of class B require higher temperatures and pressures for molding than those of class A, but the heat treatment required after molding is shorter and is much easier to carry out. By this invention it is as easy to incorporate fillers and the like with resins of class B as it has heretofore been with resins of class A, thus making it easier to realize the advantages of molding class B resins. The B-stage is preferred to the C-stage for molding because the latter cannot be handled except under extremely high temperatures and pressures.

The use of hot acetone to bring about formation of the gel in place of acetone at ordinary atmospheric temperatures and mixing the fillers with the resin and acetone before the swelling is commenced is a decided improvement in this art and produces advantageous results. The term "hot acetone" as used in the claims covers not only temperatures in the neighborhood of the normal boiling point of acetone but also such temperatures as may be obtained by heating acetone in a closed vessel at pressures above atmospheric.

Other materials may be used as swelling agents in place of acetone. For example, methyl and ethyl alcohol, ketones such as methyl-ethyl-ketone, and esters such as ethyl acetate and amyl acetate, may be employed, but none of these have been found as satisfactory as acetone.

The resins used are not only resins made from glycerol itself, but also resins made from polyhydric alcohols generally, and include also resins made from polyglycerols, such as are described in co-pending application, Serial No. 446,509, filed February 19, 1921.

The process of swelling with hot acetone is especially applicable to the manufacture of compositions which contain, besides the glycerol polybasic acid resin, either shellac, as described in co-pending application Serial No. 446,510, filed February 19, 1921, Patent No. 1413144 April 18, 1922, or a condensation product made from phenol and formaldehyde, or from their derivatives, as described in co-pending application, Serial No. 503,081 filed Sept. 24, 1921.

I claim:—

1. The step in the manufacture of a molding composition, which comprises treating with a hot swelling agent, until swelling takes place, a polyhydric alcohol-polybasic acid resin which is insoluble in said agent.

2. The step in the manufacture of a molding composition which comprises treating with a hot swelling agent, until swelling takes place, a mixture containing a polyhydric alcohol-polybasic acid resin which is insoluble in said agent.

3. The step in the manufacture of a molding composition which comprises treating with a hot swelling agent, until swelling takes place, a mixture containing a glycerol-polybasic acid resin which is insoluble in said agent.

4. The step in the manufacture of a molding composition which comprises swelling with hot acetone a polyhydric alcohol-polybasic acid resin which is insoluble in cold acetone.

5. The step in the manufacture of a molding composition which comprises swelling, with acetone at approximately the boiling point of acetone, a polyhydric alcohol-polybasic acid resin which is insoluble in cold acetone.

6. The step in the manufacture of a molding composition which comprises swelling with hot acetone a glycerol-polybasic acid resin which is insoluble in cold acetone.

7. The step in the manufacture of a molding composition which comprises treating with a hot swelling agent, until swelling takes place, a polyhydric alcohol-polybasic acid resin which is insoluble in said agent, and a filler.

8. The step in the manufacture of a molding composition which comprises treating with a hot swelling agent, until swelling takes place, a polyhydric alcohol-polybasic acid resin which is insoluble in said agent, and shellac.

9. The step in the manufacture of a molding composition which comprises swelling with acetone at approximately the boiling point of acetone, a mixture containing a glycerol-polybasic acid resin which is insoluble in cold acetone, and shellac.

In testimony whereof I affix my signature.

LOUIS WEISBERG.